Figure 1:
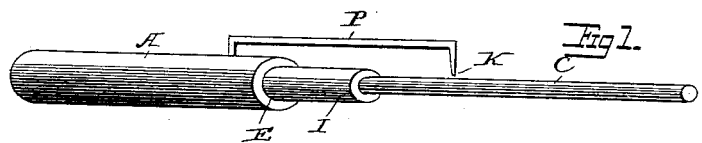

(No Model.)

E. G. ACHESON.
DEVICE FOR PROTECTING ELECTRIC CONDUCTORS.

No. 390,196. Patented Oct. 2, 1888.

Witnesses
Jno. G. Hinkel Jr.
W. S. MacArthur

Inventor
E. G. Acheson
by Foster Freeman
Attorneys

N. PETERS, Photo-Lithographer, Washington, D. C.

UNITED STATES PATENT OFFICE.

EDWARD G. ACHESON, OF PITTSBURG, PENNSYLVANIA.

DEVICE FOR PROTECTING ELECTRIC CONDUCTORS.

SPECIFICATION forming part of Letters Patent No. 390,196, dated October 2, 1888.

Application filed June 2, 1888. Serial No. 275,832. (No model.)

*To all whom it may concern:*

Be it known that I, EDWARD G. ACHESON, a citizen of the United States, residing at Pittsburg, county of Allegheny, State of Pennsylvania, have invented certain new and useful Improvements in Devices for Protecting Electric Conductors, of which the following is a full, clear, and exact specification.

The object of my invention is to provide means for protecting the insulation of electrical conductors, particularly those carrying heavy currents—such, for instance, as electric-light cables—from the evil effects of disruptive discharges, causing "grounds" or short circuits.

It is well known that most of the grounds or short circuits that occur in cables are at the terminals. Many attempts have been made to discover the cause and to remedy the evils of such troubles, and this has been done generally by taking especial pains to properly insulate the terminals and prevent the access of moisture to the conductors. I have discovered that the principal, if not the sole, cause of this disturbance is due to the static charge which is received by the cable, and which after a time increases to such a strength that a disruptive discharge takes place through the insulating or dielectric material surrounding the conductors.

It is well known that when an electric body receives a static charge the electricity is distributed throughout the body, but tends to accumulate at any points, angles, or projections which may be associated with or form part of the body. Applying this principle to conductors—as lead-covered conductors or cables carrying a plurality of conductors, which, as is well known, become highly charged with what is termed "static electricity"—when currents of electricity are passed through the conductors, we find they act as condensers, the conductor forming one pole and the lead covering the other pole and each receiving a static charge of opposite polarity. This static charge accumulates, and I have found that it is greatest at the ends of the tube, and in case the charge reaches a potential sufficiently high a disruptive discharge takes place. This discharge usually takes place at the point where there is the least resistance, and if the cable is well made and the conductor thoroughly and evenly insulated this point will be at the ends of the cable, though of course if the insulation is not good and evenly applied it may occur at other points.

In order to prevent these evils, my invention consists in providing means whereby this discharge may be caused to take place at such a point as to prevent the destruction of the insulation and before its potential is sufficiently great to pass through the dielectric surrounding the conductor or to cause a dangerous strain upon it.

My invention may be carried out practically by a variety of devices, and I have illustrated in the accompanying drawings some I have found to be efficient, and in which—

Figure 2:
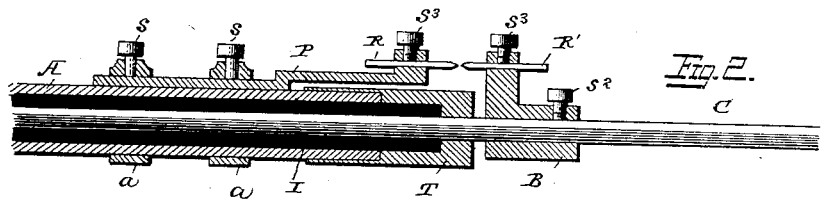
Figure 3:
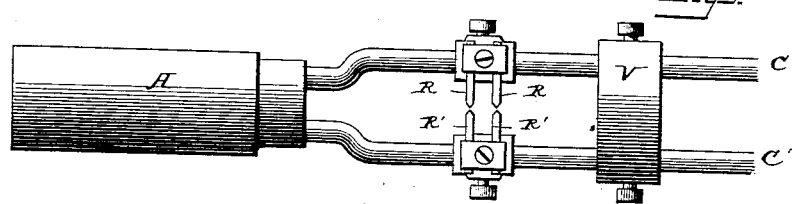
Figure 4:
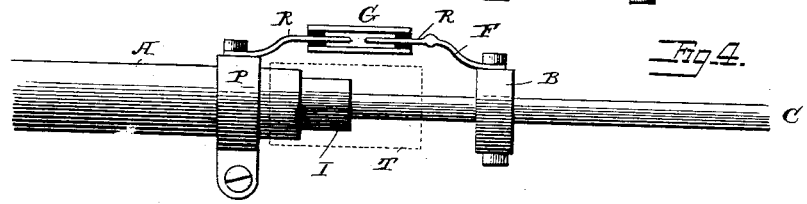
Figure 5:
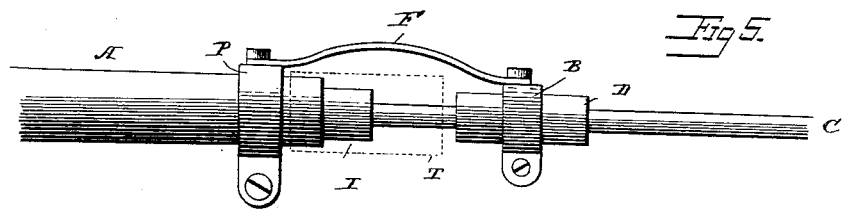
Figure 6:
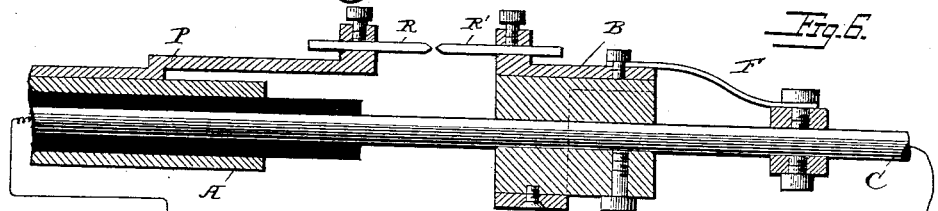

Figure 1 is a perspective view of a simple arrangement for this purpose applied to an ordinary lead-covered conductor. Fig. 2 is a sectional view of another arrangement on a similar conductor. Fig. 3 is a side view illustrating my invention applied to two conductors of a cable. Figs. 4 and 5 are side views illustrating other means, all of which operate upon substantially the same principles. Fig. 6 shows a signal and indicator applied to the conductor to designate the position and time of discharge.

In Fig. 1, A is the lead or other metallic casing or covering, C the conductor, and I the dielectric or insulating material surrounding the conductor. P is a wire or arm of some conducting material connected to the covering A and extending into proximity to the conductor C, but not in contact therewith. It is shown as being pointed at its free end, which is preferable, though not absolutely necessary. I have found that the disruptive discharge usually takes place at the end of the tube, as at E, causing a carbonization of the insulator I and destroying the utility of the conductor. By arranging the arm P so that the distance between its point and the conductor is the same or less than the shortest distance between the covering A and the insulated conductor the discharge will take place at K, and this will happen before the potential of the charge reaches a degree sufficient to pass through the insulation.

In Fig. 2 the case A and conductor C are insulated from each other by I. Suitable means, as a tape, T, are provided to cover the points of juncture of the conductor, insulator, and covering to protect them from moisture. B is a metal clamp secured to the conductor by screws $s^2$, and P is an arm clamped to the covering A by suitable means, as the rings $a$, secured by screws $s$. R R' are rods or points of platinum, carbon, or other suitable material, adjustably held in the arm and clamped by screws $s^3$. The distance between the adjacent ends of the rods may be adjusted as desired, and this distance will determine the potential of the static charge attained before the discharge will occur, and should be less than that necessary to produce the disruptive discharge through the insulation. By making the ends of these rods pointed and properly adjusting them the static charge may be caused to flow from point to point without a visible discharge, and the charge may thus be prevented from reaching a dangerous potential. If the distance between the ends of the rods is comparatively small, I have found that a cable of considerable length may be properly protected by a single set; but in practice, especially when heavy currents are used, I prefer to supply each section of cable or each terminal with the protective device. I have found it convenient to arrange the protectors at the translating devices, for instance, so that they can be readily inspected, although of course they may be otherwise arranged, as desired.

In Fig. 3, C C' are two conductors of the cable A, with the rods R R' mounted on them, V being a block of insulating material to hold the conductors at a constant distance apart. I have shown each conductor provided with a number of rods R, so that if one set should be burned away and the distance between them increased, as by an arc forming, another set would remain for use.

In Fig. 4 one rod R is held by a clamping-ring, P, to the covering A, and the other by a ring, B, to the conductor C, and between the rod and ring is a fusible connector, F. The free ends of the rods R are inclosed in an insulating-tube, G, as of glass.

In Fig. 5 the clamping-rings are connected by a fusible connector, F; and a dielectric, D, of such a resisting strength as to permit the discharge to pass through it before it will pass through the insulation of the conductor, is interposed between the ring and the conductor.

In Fig. 6 I have shown means for giving a signal and indicating to a greater or less extent the location of the discharge. A line is connected to the generator X at the neutral point of the armature, and the other end is connected to a condenser, M, and a polarized relay, N, is interposed in the line, and this is shown in position to close a local circuit and operate a signal, O, therein. By knowing the direction of the main current flowing through the conductors C C' the half of the circuit in which the discharge took place may be determined by observing the position of the armature of the polarized relay.

From the above it will be seen that my invention may be carried out in a variety of ways which will be understood by those skilled in the art, and I do not therefore limit myself to the particular arrangements shown, the essential feature being that the discharge-points are arranged at a less electrical distance from each other than the electrical resistance or distance of the insulation surrounding the conductor, so that the static charge of the conductor or cable will be discharged through the points before it reaches a potential sufficiently high to cause a disruptive discharge through the insulation.

What I claim is—

1. As a means of preventing the disruptive discharge of a conductor through its surrounding insulator, an arm arranged to receive the discharge at a potential below that necessary for striking through the insulator, substantially as described.

2. An insulated conductor or cable having static discharge-points arranged at a less electrical distance than the electrical distance of the insulation surrounding the conductor, substantially as described.

3. The combination, with an insulated conductor and its inclosing-casing, of static discharge-rods arranged on the conductor and case, substantially as described.

4. The combination, with an insulated conductor and an inclosing-case, of adjustable rods connected to the conductor and case, substantially as described.

5. The combination, with an insulated conductor and inclosing-case, of clamps mounted on said conductor and case, and adjustable rods supported in said clamps, substantially as described.

6. The combination, with a cable having an insulated conductor, of static discharge-points connected therewith, and a signal apparatus connected with the cable to indicate the discharge, substantially as described.

7. The combination, with an insulated conductor and inclosing-case, of static discharge-rods connected with the conductor and case, and a fusible connection between the rods and conductor, substantially as described.

In testimony whereof I have signed my name to this specification in the presence of two subscribing witnesses.

EDWARD G. ACHESON.

Witnesses:
H. C. BAIR,
M. F. CASSIDY.